(12) United States Patent
Niino et al.

(10) Patent No.: US 9,718,919 B2
(45) Date of Patent: Aug. 1, 2017

(54) RADICALLY POLYMERIZABLE POLYETHER, METHOD FOR PRODUCING SAID RADICALLY POLYMERIZABLE POLYETHER, POLYMERIZABLE COMPOSITION COMPRISING SAID RADICALLY POLYMERIZABLE POLYETHER AND RADICALLY POLYMERIZABLE VINYL MONOMER, AND COPOLYMER, MOLDED ARTICLE AND FILM EACH FORMED BY RADICAL POLYMERIZATION OF SAID POLYMERIZABLE COMPOSITION

(71) Applicant: Mitsubishi Rayon Co., Ltd., Tokyo (JP)

(72) Inventors: Hiroshi Niino, Tokyo (JP); Saori Kikuchi, Hiroshima (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 14/767,326

(22) PCT Filed: Feb. 13, 2014

(86) PCT No.: PCT/JP2014/053344
§ 371 (c)(1),
(2) Date: Aug. 12, 2015

(87) PCT Pub. No.: WO2014/126157
PCT Pub. Date: Aug. 21, 2014

(65) Prior Publication Data
US 2016/0002399 A1 Jan. 7, 2016

(30) Foreign Application Priority Data
Feb. 13, 2013 (JP) ................. 2013-025380

(51) Int. Cl.
*C08G 65/22* (2006.01)
*C08J 5/18* (2006.01)
*C08G 65/20* (2006.01)
*C08F 290/14* (2006.01)
*C08F 283/06* (2006.01)

(52) U.S. Cl.
CPC .......... *C08G 65/22* (2013.01); *C08F 283/065* (2013.01); *C08F 290/142* (2013.01); *C08G 65/20* (2013.01); *C08J 5/18* (2013.01); *C08J 2351/08* (2013.01)

(58) Field of Classification Search
CPC ........... C08F 62/62; C08F 62/26; C08G 65/26
See application file for complete search history.

(56) References Cited

U.S. PATENT DOCUMENTS 4,587,290 A * 5/1986 Davies ...................... C08F 2/16
524/558
5,478,920 A 12/1995 Drysdale

FOREIGN PATENT DOCUMENTS

| JP | 61-192729 A | * 8/1986 |
| JP | 09-500162 A | 1/1997 |
| JP | 09-263632 A | 10/1997 |
| JP | 59-081302 A | 10/1997 |
| JP | 2001-295181 A | 10/2001 |

OTHER PUBLICATIONS

Chagneux et al., "Synthesis of Laterally Linked Poly(tetrahydrofuran)-Poly(methyl methacrylate) Block Coplymers vis the Use of a 'Jekyll and Hyde' Comonomer", Macromolecules, vol. 40, 2007, pp. 3183-3189.*
You et al., "Bronsted acid-free controlled polymerization of tetrahydrofuran catalyzed by recyclable rare earth triflates in the presence of epoxides", Polymer, vol. 53, 2012, pp. 4112-4118.*
Chagneux et al., Synthesis of Laterally Linked Poly(tetrahydrofuran)-Poly(methylmethacrylate) Block Copolymers via Use of a "Jekyll and Hyde" Comonomer, Macromolecules, May 1, 2007, vol. 40, Issue 9, pp. 3183-3189.
You et al., Brønsted acid-free controlled polymerization of tetrahydrofuran catalyzed by recyclable rare earth triflates in the presence of epoxides, Polymer 2012, 53, pp. 4112-4118.
Saegusa et al., Cationic Homo- and Co-polymerizations of Ethyl Glycidate, Polymer Journal, 1979-06, vol. 11, No. 6, pp. 463-469.
International Search Report dated May 13, 2014 for International application No. PCT/JP2014/053344.

* cited by examiner

*Primary Examiner* — Kuo-Liang Peng
(74) *Attorney, Agent, or Firm* — Morgan, Lewis & Bockius LLP

(57) ABSTRACT

Provided is (1) a radically polymerizable polyether which imparts excellent mechanical properties including excellent transparency, a high degree of elongation at break and high bending strength to a copolymer produced by the radical polymerization of a radically polymerizable monomer, and a method for producing the radically polymerizable polyether; (2) a polymerizable composition comprising the radically polymerizable polyether and a radically polymerizable vinyl monomer, which enables the formation of a copolymer having excellent mechanical properties; and (3) a copolymer, a molded article and a film, each of which comprises the copolymer.

17 Claims, No Drawings

RADICALLY POLYMERIZABLE POLYETHER, METHOD FOR PRODUCING SAID RADICALLY POLYMERIZABLE POLYETHER, POLYMERIZABLE COMPOSITION COMPRISING SAID RADICALLY POLYMERIZABLE POLYETHER AND RADICALLY POLYMERIZABLE VINYL MONOMER, AND COPOLYMER, MOLDED ARTICLE AND FILM EACH FORMED BY RADICAL POLYMERIZATION OF SAID POLYMERIZABLE COMPOSITION

TECHNICAL FIELD

The present invention relates to 1) a radically polymerizable polyether obtained by ring-opening copolymerization of glycidyl (meth) acrylate and tetrahydrofuran and a method for producing the same, 2) a polymerizable composition containing the radically polymerizable polyether and a radically polymerizable vinyl monomer, and 3) a copolymer, a molded article, and a film which are formed by radical polymerization of the polymerizable composition, and the invention provides a radically polymerizable polyether which can form a copolymer exhibiting excellent transparency and excellent mechanical properties such as a high elongation at break and a high flexural strength by radical polymerization with a radically polymerizable vinyl monomer and a method for producing the same and also provides a polymerizable composition containing the radically polymerizable polyether and a radically polymerizable vinyl monomer and a copolymer, a molded article, and a film which are formed by radical polymerization of the polymerizable composition.

BACKGROUND ART

The oxonium ion generated by allowing a compound having a glycidyl site and a Lewis acid and the like to act is known to undergo ring-opening copolymerization with a cyclic ether such as tetrahydrofuran.

Specifically, a radically polymerizable polyether having a (meth)acryloyl group that is produced by allowing glycidyl (meth) acrylate, tetrahydrofuran, and boron trifluoride diethyl ether complex of a Lewis acid to act is disclosed in Patent Document 1. In addition, it is disclosed that the polymer composed of the radically polymerizable polyether becomes a resin exhibiting excellently balanced transparency, weather resistance, elastic modulus, and flexibility by setting the number average molecular weight the radically polymerizable polyether to from 300 to 3000 and the amount of (meth)acryloyl group introduced thereinto to from 20 to 98% by mole.

In addition, a radically polymerizable polyether (Table 1. in page 3184) which has the same backbone as that in Patent Document 1, a mass average molecular weight of from 7,900 to 18,500, a number average molecular weight of from 3,300 to 10,300, and an amount of (meth)acryloyl group introduced of from 2.5 to 5.3% by mole, a graft type block copolymer that is composed of the radically polymerizable polyether and methyl methacrylate and soluble in a solvent, and a film that is fabricated by solvent casting the graft type block copolymer are disclosed in Non-Patent Document 1.

CITATION LIST

Patent Document

Patent Document 1: JP 61-192729 A

Non-Patent Document

Non-Patent Document 1: Macromolecules, 2007, 40, pp. 3183-3184

Non-Patent Document 2: Polymer 2012, 53, 4112

In Patent Document 1, a radically polymerizable polyether is disclosed, and furthermore, an effect that the radically polymerizable polyether is capable of being copolymerized with another radically polymerizable monomer and an effect that various kinds of additives can be added to the radically polymerizable polyether are described. However, only the homopolymer of the radically polymerizable polyether is specifically disclosed in Examples and the like but a radically polymerizable polyether which can form a copolymer exhibiting excellent transparency and mechanical properties when being copolymerized with a radically polymerizable vinyl monomer as in the present invention is not disclosed.

In Non-Patent Document 1, it is described to form a film composed of a copolymer using a radically polymerizable polyether and methyl methacrylate (MMA) by a solvent casting method. However, a polymer having a high molecular weight is not obtained since the ring-opening polymerization does not sufficiently proceed by the polymerization initiator or under the polymerization conditions described.

As a result of intensive investigations, the present inventors have surprisingly found out that it is possible to impart excellent transparency and excellent mechanical properties such as a high elongation at break and a high flexural strength to a copolymer obtained by radical polymerization of a radically polymerizable polyether and a radically polymerizable monomer by setting the number average molecular weight of the radically polymerizable polyether and the amount of the (meth)acryloyl group introduced thereinto to specific ranges, thereby achieving the invention.

In addition, a method is known in which an acid, a base, a metal salt, or a Lewis acid is added as a catalyst to conduct the ring-opening polymerization of an epoxy site. It is known that an oxonium ion is generated as a catalyst coordinates an epoxy site and this oxonium ion generated induces the ring-opening polymerization of tetrahydrofuran.

Specifically, it is disclosed in Non-Patent Document 2 that a polyether copolymer composed of tetrahydrofuran and an epoxy compound is obtained by polymerization using an epoxy compound such as propylene oxide, styrene oxide, or cyclohexene oxide and a metal salt of trifluoromethanesulfonic acid composed of yttrium, scandium, lanthanum, or the like.

In addition, it is disclosed in Non-Patent Document 1 that a polyether copolymer composed of a ring-opening polymer of tetrahydrofuran and glycidyl methacrylate is obtained by polymerization using glycidyl methacrylate and tin hexachloride ether complex.

However, in Non-Patent Document 2, the polymerization is conducted in a state in which water does not exist in the reaction system as possible by subjecting the epoxy compound or the catalyst used in the reaction to the dehydrating operation but it is not disclosed that a polymer having a high molecular weight is obtained in high yield even in the case of using a metal catalyst containing hydrated water.

The invention is intended to provide a producing method which can produce a polyether copolymer having a high molecular weight in high yield by selecting a glycidyl ester compound as an epoxy compound and using a metal salt of trifluoromethanesulfonic acid as a catalyst when conducting the ring-opening copolymerization of tetrahydrofuran.

DISCLOSURE OF THE INVENTION

Problem to be Solved by the Invention

An object of the invention is to provide a radically polymerizable polyether which can impart excellent transparency and excellent mechanical properties such as a high elongation at break and a high flexural strength to a copolymer obtained by radical polymerization of a radically polymerizable monomer, and a method for producing the same.

Moreover, another object of the invention is to provide a polymerizable composition which can form a copolymer exhibiting excellent transparency and excellent mechanical properties such as a high elongation at break and a high flexural strength and contains the radically polymerizable polyether and a radically polymerizable vinyl monomer, and a copolymer, a molded article, and a film which are formed by radical polymerization of the polymerizable composition.

Means for Solving Problem

As a result of intensive investigations, the present inventors have found out that the above objects are achieved by setting the number average molecular weight of a radically polymerizable polyether to a specific range and further the amount of a (meth)acryloyl group introduced thereinto to a specific range, thereby completing the following inventions.

In addition, as a result of intensive investigations, the present inventors have found out that as a glycidyl ester compound having a carbonyl group and a metal salt of trifluoromethanesulfonic acid as a catalyst are used at a site adjacent to the epoxy group represented by the following Formula (1) when producing a polyether copolymer by ring-opening polymerization of tetrahydrofuran, the carbonyl group adjacent to the epoxy group can interact (neighboring group participation) with the epoxy group when the metal salt of trifluoromethanesulfonic acid of the catalyst coordinates the oxygen on the epoxy backbone as illustrated in the following Formula (3) and thus the ring-opening polymerization ability of tetrahydrofuran is improved as illustrated in the following Formula (4) and also found out that it is possible to produce a polyether copolymer having a high molecular weight in high yield by setting the amounts of the glycidyl ester compound and the metal salt of trifluoromethanesulfonic acid to specific ranges, respectively, thereby completing the invention.

[Chem. 3]

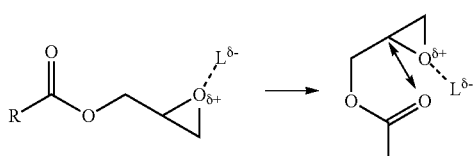

(3)

[Chem. 4]

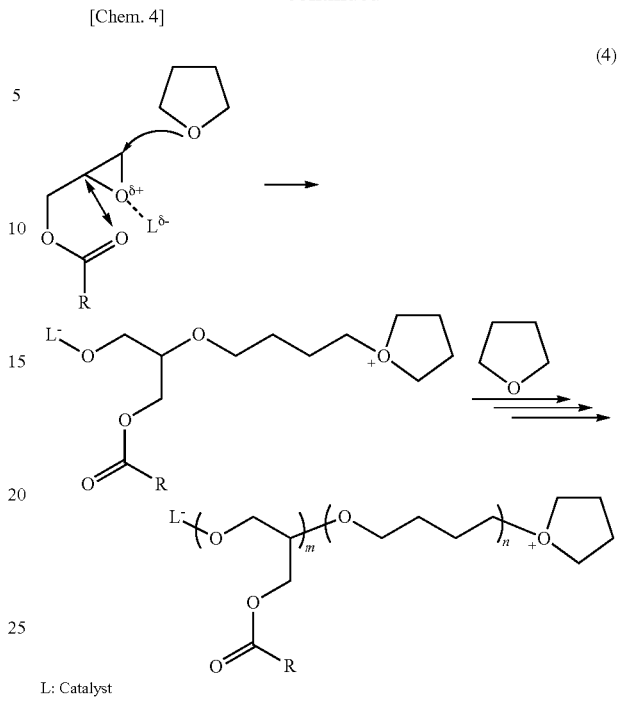

(4)

L: Catalyst

A first invention is a radically polymerizable polyether (A) which has a mass average molecular weight of from 20,000 to 100,000 and includes a polyalkylene ether backbone having a (meth)acryloyl group as a pendant group and a polytetramethylene ether backbone.

A second invention is the radically polymerizable polyether (A) according to the first invention, which has a mass average molecular weight of from 20,000 to 1000,000 and is represented by the following Formula (1).

[Chem. 1]

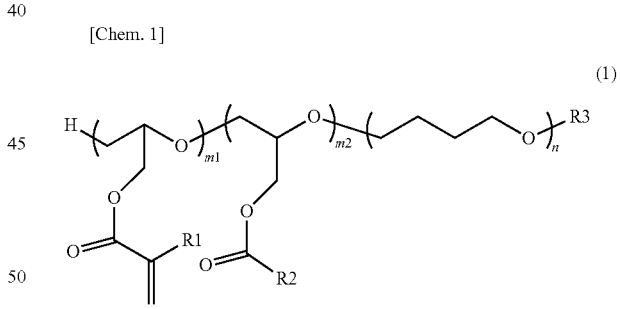

(1)

(m1 is from 1 to 7000, m2 is from 0 to 7000, n is from 1 to 14000, R1 is a methyl group or hydrogen, R2 and R3 are hydrogen or a hydrocarbon group having from 1 to 20 carbon atoms).

A third invention is the radically polymerizable polyether (A) according to the second invention, in which m1, m2, and n in Formula (1) are in a relation of $0.0005 \leq m1/(m1+m2+n) \leq 0.20$.

A fourth invention is the radically polymerizable polyether (A) according to the second invention, in which m1, m2, and n in Formula (1) are in a relation of $0.001 \leq m1/(m1+m2+n) \leq 0.10$.

A fifth invention is a polymerizable composition (C) which comprises the radically polymerizable polyether (A) according to any one of the first to fourth inventions and a radically polymerizable vinyl monomer (B) as main components and is formed by blending the component (B) at from 99 to 1% by mass with respect to from 1 to 99% by mass of the component (A).

A sixth invention is the polymerizable composition (C) according to the fifth invention, in which the radically polymerizable vinyl monomer (B) is a (meth)acrylic monomer.

A seventh invention is a copolymer formed by radical polymerization of the polymerizable composition (C) according to the fifth or sixth invention.

An eighth invention is a molded article formed by radical polymerization of the polymerizable composition (C) according to the fifth or sixth invention after being shaped into a desired shape.

A ninth invention is a film formed by radical polymerization of the polymerizable composition (C) according to the fifth or sixth invention.

A tenth invention is the film according to the ninth invention, which has a thickness of from 0.1 to 3000 µm.

An eleventh invention is the film according to the ninth or tenth invention, which has an elongation at break of 10% or more when a tension speed is 500 mm/min.

A twelfth invention is the film according to any one of the ninth to eleventh inventions, which has a haze of 5% or less when a thickness thereof is 0.5 mm.

A thirteenth invention is a method for producing a radically polymerizable polyether (A), in which ring-opening polymerization of tetrahydrofuran is conducted by allowing a glycidyl ester (a) represented by the following Formula (2) to act at from 1 to 20 parts by mass to 100 parts by mass of tetrahydrofuran in the presence of a metal salt of trifluoromethanesulfonic acid (b) at from 0.1 to 5 parts by mass.

[Chem. 2]

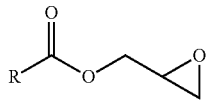

(2)

(R is a straight-chain or branched chain hydrocarbon group having from 1 to 20 carbon atoms and a hydrocarbon group having an unsaturated bond and from 2 to 10 carbon atoms).

A fourteenth invention is the producing method according to the thirteenth invention, in which a mass ratio (a)/(b) of the glycidyl ester (a) to the metal salt of trifluoromethanesulfonic acid (b) is from 2 to 9.

A fifteenth invention is the producing method according to the thirteenth or fourteenth invention, in which the glycidyl ester (a) is glycidyl methacrylate.

A sixteenth invention is the producing method according to any one of the thirteenth to fifteenth inventions, in which the metal of the metal salt of trifluoromethanesulfonic acid (b) is one or more kinds selected from the group consisting of scandium, yttrium, and lanthanoid.

A seventeenth invention is the producing method according to any one of the thirteenth to sixteenth inventions, in which the metal salt of trifluoromethanesulfonic acid (b) is ytterbium trifluoromethanesulfonate hydrate.

Mode(S) for Carrying out the Invention

Synthesis of Radically Polymerizable Polyether (A)

The radically polymerizable polyether (A) of the invention has a structure in which a (meth)acryloyl group of a polymerizable group is bonded to the polyether backbone in a pendent shape. Examples of the radically polymerizable polyether (A) may include those which are obtained by the ring-opening polymerization of tetrahydrofuran through the action of a glycidyl ester (a) in the presence of a metal salt of trifluoromethanesulfonic acid (b) and represented by the following Formula (1).

The radically polymerizable polyether (A) represented by the following Formula (1) can be produced by polymerizing glycidyl (meth)acrylate and tetrahydrofuran using protonic acid, an ion complex, a Lewis acid, an active halide, and the like as the catalyst and stopping the reaction by addition of a compound having active hydrogen such as an alcohol having 1 to 20 carbon atoms or water.

[Chem. 1]

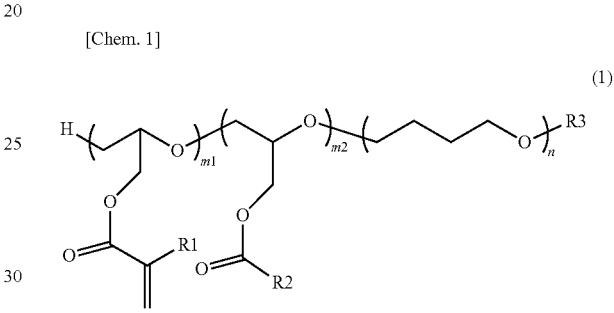

(1)

(m1 is from 1 to 7000, m2 is from 0 to 7000, n is from 1 to 14000, R1 is a methyl group or hydrogen, R2 and R3 are hydrogen or a hydrocarbon group having from 1 to 20 carbon atoms).

It is preferable to set the mass average molecular weight of the radically polymerizable polyether (A) to from 20,000 to 1,000,000 in order to impart excellent transparency and excellent mechanical properties such as a high elongation at break and a high flexural strength to the copolymer when the radically polymerizable polyether (A) is copolymerized with a radically polymerizable vinyl monomer (B). The number average molecular weight of the radically polymerizable polyether (A) is preferably from 20,000 to 100,000. It is more preferable that the mass average molecular weight is from 20,000 to 200,000 and the number average molecular weight is from 11,000 to 50,000 since the viscosity when the radically polymerizable polyether (A) is mixed with the radically polymerizable vinyl monomer (B) is relatively low and handling of the mixture is favorable.

In the radically polymerizable polyether (A), when the degree of polymerization of the glycidyl (meth)acrylate-derived backbone is m1, the degree of polymerization of the glycidyl ester-derived backbone not having a radically polymerizable functional group is m2, and the degree of polymerization of tetrahydrofuran is n, m1/(m1+m2+n) is preferably 0.0005≤m1/(m1+m2+n) 0.20 and more preferably 0.001≤m1/(m1+m2+n)≤0.10 in order to impart a high elongation at break and a high flexural strength to the copolymer when the radically polymerizable polyether (A) is copolymerized with the radically polymerizable vinyl monomer (B).

Method for Producing Radically Polymerizable Polyether (A)

The glycidyl ester (a) represented by the following Formula (2) used for the production of the radically polymerizable polyether (A) is not particularly limited as long as it is a compound in which glycidol and a carboxylic acid consisting of a straight-chain or branched chain hydrocarbon group having from 1 to 20 carbon atoms and a hydrocarbon group having an unsaturated bond and from 2 to 10 carbon atoms are bonded to each other by an ester bond. It is preferable since the polymerization activity of the oxygen of the epoxy group when being coordinated by the catalyst is improved as the carbonyl group is present near the epoxy group backbone.

[Chem. 2]

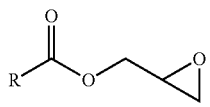

(2)

(R is a straight-chain or branched chain hydrocarbon group having from 1 to 20 carbon atoms and a hydrocarbon group having an unsaturated bond and from 2 to 10 carbon atoms).

Examples of the glycidyl ester (a) may include glycidyl acrylate and glycidyl methacrylate, which may be used concurrently with one or two or more of glycidyl acetate, glycidyl propionate, glycidyl butyrate, and glycidyl stearate.

The amount of the glycidyl ester (a) used can be appropriately decide in the range of from 1 to 20 parts by mass to 100 parts by mass of tetrahydrofuran, but it is preferably from 1.5 to 6.0 parts by mass in order to increase the molecular weight of the polyether-based copolymer to be obtained.

The metal salt of trifluoromethanesulfonic acid (b) is not particularly limited as long as it exhibits the properties as a Lewis acid, but it is preferably a metal salt hydrate or a metal salt anhydride of trifluoromethanesulfonic acid in which the metal is at least one kind of metal selected from scandium, yttrium, and lanthanoid and more preferably a metal salt hydrate of trifluoromethanesulfonic acid containing the above metal in order to act as a Lewis acid even in the presence of water. Furthermore, ytterbium trifluoromethanesulfonate hydrate is more preferable in which the metal is ytterbium (an element belonging to lanthanoid) from the viewpoint of being highly active with respect to the ring-opening polymerization of tetrahydrofuran.

The amount of the metal salt of trifluoromethanesulfonic acid (b) used is preferably from 0.1 to 5 parts by mass and more preferably from 0.2 to 5 parts by mass to 100 parts by mass of tetrahydrofuran. The amount used is even more preferably from 0.4 to 1.3 parts by mass in order to increase the molecular weight of the polyether-based copolymer to be obtained and from the viewpoint of ease of removal of the catalyst.

Tetrahydrofuran used in the invention is not particularly required to be subjected to a dehydrating operation in order to decrease its water content but tetrahydrofuran in a water-containing state may be used. The water content is preferably 1 mass % or less since there is a possibility that the ring-opening polymerization does not proceed.

The solvent for polymerization may not be used, but an organic solvent such as hexane, heptane, octane, or diethyl ether may be used as a solvent for polymerization.

The polymerization temperature can be appropriately decided in the range of from −100 to 80° C. The temperature is more preferably from room temperature to 50° C. from the viewpoint of suppressing the thermal runaway and the volatilization of tetrahydrofuran at the time of ring-opening polymerization.

The polymerization time can be appropriately decided in the range of from 0.1 to 144 hours. The polymerization time is preferably in the range of from 0.5 to 72 hours from the viewpoint of production cost, the viscosity of the solution for polymerization, and the like.

By adding a compound having active hydrogen, a backbone derived from the compound having active hydrogen is introduced into the terminal of the polyether-based copolymer and thus the polymerization reaction can be stopped. Examples of the compound having active hydrogen may include water and a straight-chain or branched chain alcohol having from 1 to 20 carbon atoms. Examples of the straight-chain or branched chain alcohol having from 1 to 20 carbon atoms may include methanol, ethanol, propanol, isopropanol, n-butyl alcohol, iso-butyl alcohol, and tert-butyl alcohol.

There is a possibility that the radical polymerization proceeds depending on the reaction temperature in the case of using a radically polymerizable glycidyl ester (a) such as glycidyl (meth)acrylate, and thus a polymerization inhibitor such as a hydroquinone derivative or a nitroxy radical including TEMPO may be added to the solution for polymerization in advance. The amount thereof added is preferably from 0.0001 to 1 part by mass to 100 parts by mass of the radically polymerizable glycidyl ester (a) used in the polymerization reaction.

Polymerizable composition (C) containing radically polymerizable polyether (A) and radically polymerizable vinyl monomer (B) as main components The polymerizable composition (C) containing the radically polymerizable polyether (A) and the radically polymerizable vinyl monomer (B) as the main components is obtained by blending the radically polymerizable vinyl monomer (B) with the radically polymerizable polyether (A), and the component (B) is blended at from 99 to 1% by mass to from 1 to 99% by mass of the component (A). The sum of the component (A) and the component (B) in the polymerizable composition (C) is preferably from 50 to 100% by mass and more preferably from 80 to 99% by mass.

As this radically polymerizable vinyl monomer (B), it is possible to use a (meth)acrylic monomer, a styrene-based monomer.

The (meth)acrylic monomer refers to a monomer composed of an ester of methacrylic acid or an ester of acrylic acid, and specific examples thereof may include acrylic acid, methyl acrylate, ethyl acrylate, propyl acrylate, butyl acrylate, isobutyl acrylate, t-butyl acrylate, pentyl acrylate, hexyl acrylate, cyclohexyl acrylate, 2-ethylhexyl acrylate, stearyl acrylate, methacrylic acid, methyl methacrylate, ethyl methacrylate, propyl methacrylate, butyl methacrylate, isobutyl methacrylate, t-butyl methacrylate, pentyl methacrylate, hexyl methacrylate, cyclohexyl methacrylate, 2-ethylhexyl methacrylate, and stearyl methacrylate. It is possible to appropriately select and use one kind or two or more kinds among these if necessary.

Examples of the styrene-based monomer may include styrene, o-methylstyrene, m-methylstyrene, p-methylstyrene, p-methylstyrene, α-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecyl styrene, p-phenylstyrene, and 3,4-dichlorostyrene. It is possible to appropriately select and use one kind or two or more kinds among these if necessary.

The copolymer to be formed exhibits excellent transparency and excellent mechanical properties such as a high elongation at break and a high flexural strength when the composition ratio of the radically polymerizable polyether (A) to the radically polymerizable vinyl monomer (B) in the polymerizable composition (C) is set to the range that the radically polymerizable polyether (A) is from 1 to 99% by mass and the radically polymerizable vinyl monomer (B) is from 99 to 1% by mass.

Furthermore, it is preferable that the composition ratio of the polymerizable composition (C) is set such that the radically polymerizable polyether (A) is from 20% by mass or more and the radically polymerizable vinyl monomer (B) is 80% by mass or less since the copolymer to be formed exhibits excellent punching workability as well as excellent transparency and excellent mechanical properties such as a high elongation at break and a high flexural strength.

Furthermore, it is preferable that the composition ratio of the polymerizable composition (C) is set such that the radically polymerizable polyether (A) is from 50% by mass or less and the radically polymerizable vinyl monomer (B) is 50% by mass or more since the viscosity when the radically polymerizable polyether (A) is mixed with the radically polymerizable vinyl monomer (B) is relatively low and handling of the mixture is favorable as well as the copolymer to be formed exhibits excellent transparency and excellent mechanical properties such as a high elongation at break and a high flexural strength.

Components of Polymerizable Composition (C)

The polymerizable composition (C) contains the radically polymerizable polyether (A) and the radically polymerizable vinyl monomer (B) as the main components, but the radically polymerizable polyether (A) and the radically polymerizable vinyl monomer (B) can be radically polymerized by appropriately selecting and adding an azo-based initiator, a peroxide-based initiator, and the like as the polymerization initiator.

As the polymerization form, it is possible to employ photopolymerization, bulk thermal polymerization, solution polymerization, suspension polymerization, emulsion polymerization, and the like, and the polymerization is conducted by appropriately adding water or an organic solvent depending on the polymerization form.

Examples of the thermal polymerization initiator may include an organic peroxide-based polymerization initiator such as benzoyl peroxide, lauroyl peroxide, t-butyl peroxyisobutyrate, t-butyl peroxy-2-ethylhexanoate, t-butyl peroxyneodecanoate, t-hexyl peroxypivalate, diisopropyl peroxydicarbonate, or bis(4-t-butylcyclohexyl) peroxydicarbonate; and an azo-based polymerization initiator such as 2,2'-azobisisobutyronitrile, 2,2'-azobis(2,4-dimethylvaleronitrile), or 2,2'-azobis(4-methoxy-2,4-dimethylvaleronitrile). These may be used singly or two or more kinds thereof may be used concurrently.

Examples of the photopolymerization initiator may include 1-hydroxy-cyclohexyl phenyl ketone, 2-hydroxy-2-methyl-1-phenylpropan-1-one, methyl phenyl glyoxylate, acetophenone, benzophenone, diethoxyacetophenone, 2,2-dimethoxy-2-phenylacetophenone, 1-phenyl-1,2-propandione-2-(o-ethoxycarbonyl)oxime, 2-methyl[4-(methylthio)phenyl]-2-morpholino-1-propanone, benzyl, benzoin methyl ether, benzoin ethyl ether, benzoin isopropyl ether, benzoin isobutyl ether, 2-chlorothioxanthone, isopropylthioxanthone, 2,4,6-trimethylbenzoyldiphenylphosphine oxide, benzoyldiphenylphosphine oxide, 2-methylbenzoyldiphenylphosphine oxide, and benzoyldimethoxyphosphine oxide. These may be used singly or two or more kinds thereof may be used concurrently.

It is possible to blend an additive such as a mold releasing agent into the polymerizable composition (C) if necessary in addition to the radically polymerizable polyether (A), the radically polymerizable vinyl monomer (B), and the polymerization initiator.

The amount of the mold releasing agent blended is preferably 0.001 part by mass or more and more preferably 0.005 parts by mass or more with respect to 100 parts by mass of the polymerizable composition before the addition of the mold releasing agent and the polymerization initiator from the viewpoint of favorable peeling property. Examples of such a mold releasing agent may include dioctyl sodium sulfosuccinate (trade name: AEROSOL OT-100) manufactured by Nihon Cytec Industries Inc. and a 55:45 mixture of diethyl phosphate and monoethyl phosphate (trade name: JP-502) manufactured by JOHOKU CHEMICAL CO., LTD.

In addition, it is possible to add various kinds of additives such as a lubricant, a plasticizer, an antibacterial agent, an antifungal agent, a light stabilizer, an ultraviolet absorber, a bluing agent, a dye, an antistatic agent, and a heat stabilizer if necessary as additives other than the mold releasing agent.

Shaping and Radical Polymerization of Polymerizable Composition (C)

It is possible to obtain a copolymer as the radically polymerizable polyether (A) and the radically polymerizable vinyl monomer (B) are reacted with a vinyl group by radical polymerization of the polymerizable composition (C).

In addition, it is possible to form a molded article having a desired form such as a film by radical polymerization of the polymerizable composition (C) after being shaped into a desired shape, for example, as the following (1) and (2).

(1) A mold having a cavity shape corresponding to the molded article is prepared, the polymerizable composition (C) containing the polymerization initiator is injected into the cavity via a gasket or the like, and active energy ray irradiation, heating or the like is conducted from one side or both sides of the mold to cure the polymerizable composition (C) by radical polymerization.

(2) A coating film of the polymerizable composition (C) is continuously formed on a traveling belt, active energy ray irradiation, heating or the like is continuously conducted from one side or both sides of the belt to cure the coating film of the polymerizable composition (C) by radical polymerization, and then the coating film cured is peeled off from the belt.

The polymer, molded article, and film which are formed by radical polymerization of the polymerizable composition (C) exhibit excellent transparency and excellent mechanical properties such as a high elongation at break and a high flexural strength.

Film Formed

In the case of forming a film by radical polymerization of the polymerizable composition (C), it is preferable to form the film so as to have a thickness of from 0.1 to 3000 μm. The mechanical properties are excellent when the thickness of the film is 0.1 μm or more and the flexural property is excellent when the thickness is 3000 μm or less. The thickness of the film is more preferably from 200 to 1000 μm.

In addition, this film exhibits excellent transparency and excellent mechanical properties such as a high elongation at break and a high flexural strength as described above, and specifically, it is preferable that the elongation at break when the tension speed is 500 mm/min is 10% or more for the elongation at break and the haze when the thickness of the film is 0.5 mm is 5% or less for the transparency.

It is not desirable that the elongation at break is less than 10% since the film is not deformed but is likely to break (crack) in a case in which an external force is applied thereto. In addition, it is not desirable that the haze of the above exceeds 5% since the transparency of the film may decrease or the printability thereof deteriorates.

EXAMPLES

Hereinafter, the invention will be specifically described with reference to Examples.

The evaluation of the radically polymerizable polyether (A) was carried out by the following methods.

(1) $^1$H-NMR Spectrum

The structure of the compound was confirmed by $^1$H-NMR spectrum.

CDCl$_3$ was used as the solvent for measurement and tetramethylsilane was used as the standard substance, and the measurement was conducted using a nuclear magnetic resonance apparatus (JNM EX-270 manufactured by JEOL Ltd.). The measurement temperature was room temperature, and the integration number for the measurement was 16 times.

(2) Measurement of Molecular Weight

The number average molecular weight (Mn), mass average molecular weight (Mw), and molecular weight distribution (Mw/Mn) of the polymer were measured by GPC (HLC-8220 manufactured by Tosoh Corporation, column: TSK-GEL SUPER H-4000 and TSK-GEL SUPER H-2000 connected in series) using polystyrene as the standard substance.

The measurement was conducted under the conditions of eluent: chloroform, measurement temperature: 40° C., and flow rate: 0.6 mL/min.

The evaluation of the acrylic film obtained by copolymerizing the radically polymerizable polyether (A) and the radically polymerizable vinyl monomer (B) of the present Example was carried out by the following methods.

(1) Total Luminous Transmittance

The total luminous transmittance of the acrylic film cut into 5 cm$^2$ was measured in conformity with JIS K7361-1 using a haze meter (trade name: NDH2000 manufactured by NIPPON DENSHOKU INDUSTRIES Co., LTD.).

(2) Haze

The value of haze of the acrylic film cut into 5 cm$^2$ was measured in conformity with JIS K7105 using a haze meter (trade name: NDH2000 manufactured by NIPPON DENSHOKU INDUSTRIES Co., LTD.).

(3) Glass Transition Temperature (Tg)

A test piece of a dumbbell-shaped No. 1 type acrylic film was fabricated using Super Dumbbell Cutter (product name: SDK-100D manufactured by DUMBBELL CO., LTD.) and both ends thereof was cut. The test piece thus obtained was subjected to the measurement using a dynamic viscoelasticity measuring apparatus (trade name: EXSTARDMS6100 manufactured by Hitachi High-Tech Science Corporation) under the measurement conditions of a frequency of 1 Hz, a temperature of from 30 to 150° C., and a rate of temperature rise of 2° C./min, and the temperature at which the temperature-tan δ curve thus obtained showed the maximum value was adopted as the glass transition temperature (Tg).

(4) Elastic Modulus

Five test pieces of a dumbbell-shaped No. 1 type acryl film were fabricated in conformity with JIS K6251 using Super Dumbbell Cutter (product name: SDK-100D manufactured by DUMBBELL CO., LTD.). The test piece thus obtained was subjected to the tensile test 5 times at room temperature of 23° C. and a tension speed of 500 mm/min using a tension testing machine (trade name: Strograph T manufactured by TOYO SEIKI SEISAKU-SHO, LTD.), and the average value of the tangential lines of the stress-strain curve at that time was determined and adopted as the elastic modulus.

(5) Elongation at Break

Five test pieces of a dumbbell-shaped No. 1 type acryl film were fabricated in conformity with JIS K6251 using Super Dumbbell Cutter (product name: SDK-100D manufactured by DUMBBELL CO., LTD.). The test piece thus obtained was subjected to the tensile test 5 times at room temperature of 23° C. and a tension speed of 500 mm/min using a tension testing machine (trade name: Strograph T manufactured by TOYO SEIKI SEISAKU-SHO, LTD.), and the elongation at break was determined as the average value.

(6) Evaluation on Flexure

The acrylic film cut into 5 cm$^2$ was subjected to 90° flexure. Specifically, the layered article was cut into a size of 5 cm×5 cm and bent for 2 seconds so as to have a 90° curvature radius of 1 mm. The following two-stage evaluation was visually performed.

(C): it is broken at the time of bending or in the middle of bending.

(B): it is favorable without breaking or whitening.

Production Example 1

To a 1000 ml three-necked flask equipped with a stirrer, a thermometer, and a cooling tube, 600 g of tetrahydrofuran (manufactured by Wako Pure Chemical Industries, Ltd.) and 2 g of ytterbium(III) trifluoromethanesulfonate hydrate (manufactured by Tokyo Chemical Industry Co., Ltd.) were added and stirred at room temperature. After it was confirmed that ytterbium triflate hydrate was dissolved, 24 g of glycidyl methacrylate (manufactured by Wako Pure Chemical Industries, Ltd.) was added thereto. After the addition, the mixture was stirred for 11 hours at room temperature (25° C.). After stirring, 50 g of ethanol (manufactured by Wako Pure Chemical Industries, Ltd.) was added thereto to stop the reaction. After the reaction was terminated, unreacted tetrahydrofuran or excess ethanol was distilled off using an evaporator, thereby obtaining 437 g of a white solid (yield: 70%).

The mass average molecular weight of the white solid thus obtained by GPC measurement was 45,000. In addition, the result of $^1$H-NMR measurement is presented below. The peaks of protons derived from the ring opening derivative of glycidyl methacrylate were observed at 5.55, 6.15, 4.15, 4.05, and 1.9, and the peaks of protons derived from the ring opening derivative of tetrahydrofuran were observed at from 3.1 to 3.9 and 1.6. It was confirmed that the white solid obtained from the above was a copolymer of poly(3-methacryloxypropene oxide) composed of a (meth)acryloyl backbone and polybutylene oxide. In addition, it was confirmed that the introduction rate, (m1/(m1+m2+n)), of poly(3-methacryloxypropene oxide) was 0.035 from the degree of polymerization, m, of poly(3-methacryloxypropene oxide) and the degree of polymerization, n, of polybutylene oxide in the radically polymerizable polyether.

$^1$H-NMR 0.95 (s') 1.60 (m), 1.9 (s), 2.35 (s') 3.1 to 3.9 (m), 4.05 (s), 4.25 (m), 5.55 (s), and 6.13 (s)

Production Example 2

Production Example 2 was conducted in the same manner as in Production Example 1 except that the amounts of tetrahydrofuran, glycidyl methacrylate, ytterbium triflate hydrate, and ethanol used and the reaction time were changed to the amounts and the reaction time presented in Table 1. The mass average molecular weight of the copolymer thus obtained by GPC measurement was 14500. In addition, the introduction rate, m1/(m1+m2+n), of the glycidyl methacrylate-derived backbone was 0.081 where the degree of polymerization of the glycidyl methacrylate-derived backbone was m and the degree of polymerization of tetrahydrofuran was n.

Production Example 1'

To a separatory funnel, 60 g of the white solid obtained in Preparation Example 1 was transferred, 90 ml of ethyl acetate and 90 ml of pure water were added thereto, and the liquid separating operation was conducted. The organic layer after washing was dehydrated over anhydrous magnesium sulfate. This was filtered and ethyl acetate was then distilled off using an evaporator, thereby obtaining a white solid of radically polymerizable polyether. The results of GPC measurement and $^1$H-NMR measurement were identical to those of Preparation Example 1.

The glass plates of 300 mm long and 300 mm wide were faced each other at 0 5 mm intervals via a polyvinyl chloride gasket to form a mold, the polymerizable composition to which the mold releasing agent described above was added was injected into the mold thus formed. Subsequently, this mold was irradiated with light for 120 minutes at a peak illuminance of 2.1 mJ/cm$^2$ using a chemical lamp to conduct the photopolymerization of the polymerizable composition having the mold releasing agent added, and the mold was subsequently heated for 30 minutes in an air oven at 130° C. to complete the polymerization. Thereafter, the mold was cooled to room temperature, the frame of the mold was removed, thereby obtaining an acrylic film having an average thickness of about 500 μm. The evaluation results are presented in Table 2.

Examples 2 to 4

Examples 2 to 4 were conducted in the same manner as in Example 1 except that the amount of the radically polymerizable polyether produced in Production Example 1 used was changed to the amount presented in Table 2 to obtain acrylic films. The evaluation results are presented in Table 2.

TABLE 1

|  |  | Production Example 1 | Production Example 1' | Production Example 2 |
|---|---|---|---|---|
| Monomer A | Glycidyl methacrylate/part by mass | 24 | 24 | 24 |
| Monomer B | Tetrahydrofuran/part by mass | 600 | 600 | 600 |
| Initiator | Ytterbium trifluoromethanesulfonate/part by mass | 2 | 2 | 3 |
| Terminator | Ethanol/part by mass | 50 | 50 | 50 |
| Reaction temperature/° C. |  | 25 | 25 | 25 |
| Reaction time/hour |  | 11 | 11 | 2 |
| Yield/% |  | 68 | 68 | 22 |
| Number average molecular weight (Mn) |  | 24900 | 24900 | 8400 |
| Mass average molecular weight (Mw) |  | 45000 | 45000 | 14500 |
| Molecular weight distribution (Mw/Mn) |  | 1.8 | 1.8 | 1.7 |
| m1/(m1 + m2 + n) |  | 0.035 | 0.035 | 0.081 |
| Catalyst removing operation (aqueous cleaning) |  | No | Yes | No |

Example 1

Preparation of Polymerizable Composition

The polymerizable composition was obtained by adding the radically polymerizable polyether at 20% by mass produced in Preparation Example 1, methyl methacrylate at 80% by mass (trade name: ACRYESTER M manufactured by Mitsubishi Rayon Co., Ltd.), and 1-hydroxy-cyclohexyl-phenyl-ketone (trade name: Irgacure 184 manufactured by BASF Japan Ltd.) as the polymerization initiator at 0.3% by mass to 100% by mass of the monomer mixture of the radically polymerizable polyether and methyl methacrylate. Furthermore, dioctyl sodium sulfosuccinate (trade name: AEROSOL OT-100 manufactured by Nihon Cytec Industries Inc.) as the mold releasing agent was added thereto at 0.05% by mass and mixed, and the mixture was then subjected to the degassing treatment under reduced pressure.

Comparative Example 1

Comparative Example 1 was conducted in the same manner as in Example 1 except that the radically polymerizable polyether produced in Preparation Example 1 was changed to the radically polymerizable polyether produced in Preparation Example 2 to obtain an acrylic film. The evaluation results are presented in Table 2.

In Comparative Example 1, the mass average molecular weight of the radically polymerizable polyether was as low as less than 20000 and thus the transparency of the copolymer and the properties thereof with respect to flexure were poor.

TABLE 2

|  |  | Example 1 | Example 1' | Example 2 | Example 3 | Example 4 | Comparative Example 1 |
|---|---|---|---|---|---|---|---|
| Radically polymerizable polyether (A)/ | Production Example 1 | 20 | — | 30 | 40 | 50 | — |
|  | Production Example 1' | — | 20 | — | — | — | — |

TABLE 2-continued

|  |  | Example 1 | Example 1' | Example 2 | Example 3 | Example 4 | Comparative Example 1 |
|---|---|---|---|---|---|---|---|
| % by mass | Production Example 2 | — | — | — | — | — | 20 |
| (Meth)acrylic acid ester monomer (B)/% by mass | Methyl methacrylate | 80 | 80 | 70 | 60 | 50 | 80 |
| Initiator | Irgacure 184/% by mass | 0.3 | 0.3 | 0.3 | 0.3 | 0.3 | 0.3 |
| Mold releasing agent | AEROSOL AOT-100/% by mass | 0.05 | 0.05 | 0.05 | 0.05 | 0.05 | 0.05 |
| 1st polymerization condition | Illuminance/mW/cm$^2$ | 2.1 | 2.1 | 2.1 | 2.1 | 2.1 | 2.1 |
|  | Polymerization time/hour | 2 | 2 | 2 | 2 | 2 | 2 |
| 2nd polymerization condition | Polymerization temperature/° C. | 130 | 130 | 130 | 130 | 130 | 130 |
|  | Polymerization time/hour | 0.5 | 0.5 | 0.5 | 0.5 | 0.5 | 0.5 |
| Optical properties | Total luminous transmittance/% | 92.5 | 92.6 | 92.6 | 92.7 | 92.7 | 93.3 |
|  | Haze/% | 0.5 | 0.2 | 0.5 | 1.6 | 2.7 | 18.2 |
| Mechanical properties | Elongation at break/% | 19.4 | 21.3 | 71.1 | 91.2 | 61.6 | 20.2 |
|  | Elastic modulus/GPa | 1.8 | 1.6 | 0.9 | 0.5 | 0.2 | 1.8 |
|  | Flexural property | B | B | B | B | B | C |
| Thermal properties | Glass transition temperature/° C. | 119 | 119 | 116 | 103 | 83 | 104 |

Example 1'

Example 1' was conducted in the same manner as in Example 1 except that the radically polymerizable polyether produced in Preparation Example 1 was changed to the radically polymerizable polyether produced in Preparation Example 1' to obtain an acrylic film. The evaluation results are presented in Table 2.

[Evaluation on Weather Resistance]

In addition, the films obtained in Example 1 and Example 1' were subjected to the weather resistance test. The weather resistance test of the acrylic films cut into 3 cm$^2$ was conducted by DAIPLA METAL WEATHER KU-R4-W model (manufactured by DAIPLA WINTES CO., LTD.). The test cycle was as follows. Irradiation for 4 hours (humidity: 70% RH, black panel temperature: 63° C.)/condensation for 4 hours (humidity: 98% RH, black panel temperature: 30° C.)/shower for 10 seconds (70° C.)/darkness for 4 hours (humidity: 70% RH, black panel temperature: 65° C.)/shower for 10 seconds (30° C.). The optical properties of the film after a lapse of 96 hours under the conditions of a UV intensity of 140 mW/cm$^2$ and the above test cycle were evaluated. The evaluation results are presented in Table 4.

The film fabricated in Example 1' maintained a high total luminous transmittance and a low haze value even after the weather resistance test. In Example 1', the radically polymerizable polyether (A) was washed with water after the synthesis and thus the degradation in optical performance of the film fabricated after the weather resistance test was suppressed.

Example 5

Preparation of Polymerizable Composition

The polymerizable composition was obtained by adding the radically polymerizable polyether at 20% by mass produced in Preparation Example 1, methyl methacrylate at 80% by mass (trade name: ACRYESTER M manufactured by Mitsubishi Rayon Co., Ltd.), and t-hexyl peroxypivalate (trade name: Perhexyl PV) as the polymerization initiator at 0.3% by mass to 100% by mass of the monomer mixture of the radically polymerizable polyether and methyl methacrylate. Furthermore, dioctyl sodium sulfosuccinate (trade name: AEROSOL OT-100 manufactured by Nihon Cytec Industries Inc.) as the mold releasing agent was added thereto at 0.05% by mass and mixed, and the mixture was then subjected to the degassing treatment under reduced pressure.

The glass plates of 300 mm long and 300 mm wide were faced each other at 3 mm intervals via a polyvinyl chloride gasket to form a mold, the polymerizable composition to which the mold releasing agent described above was added was injected into the mold thus formed. Subsequently, this mold was subjected to thermal polymerization for 120 minutes in a warm bath at 80° C. and subsequently heated for 30 minutes in an air oven at 130° C. to complete the polymerization. Thereafter, the mold was cooled to room temperature, the frame of the mold was removed, thereby obtaining an acrylic film having an average thickness of about 3000 μm. The evaluation results are presented in Table 3.

[Evaluation on Impact Resistance]

The impact resistance of the copolymer obtained in Example 5 was evaluated.

Charpy Impact Test

The Charpy impact strength of the copolymer obtained in Example 5 was measured in conformity with JIS-K7111. A test piece having a length of 8 cm×a width of 1 cm×and a thickness of 3 mm was cut out and the measurement was conducted under the condition of being flatwise and unnotched. The evaluation results are presented in Table 3.

Falling Weight Impact Test

The impact resistance of the copolymer obtained in Example 5 was evaluated using DuPont impact testing machine. A resin plate cut into a square of 50 mm for each side was used as the sample, and the 50% breaking energy was evaluated in conformity with the standard of JIS-K7211 at a punch radius of 7.9 mm and a mortar radius of 15 2 mm using a weight of 500 g. The evaluation results are presented in Table 3.

TABLE 3

|  |  | Example 5 |
|---|---|---|
| Radically polymerizable polyether (A)/% by mass | Production Example 1 | 20 |
| (Meth)acrylic acid ester monomer (B)/% by mass | Methyl methacrylate | 80 |
| Initiator | Perhexyl PV/% by mass | 0.3 |
| Mold releasing agent | AEROSOL AOT-100/% by mass | 0.05 |
| 1st polymerization | Polymerization temperature/° C. | 80 |

TABLE 3-continued

|  |  | Example 5 |
|---|---|---|
| condition | Polymerization time/hour | 2 |
| 2nd polymerization | Polymerization temperature/° C. | 130 |
| condition | Polymerization time/hour | 0.5 |
| Optical properties | Total luminous transmittance/% | 92.4 |
|  | Haze/% | 0.65 |
| Impact resistance | DuPont impact value/J | 1.6 |
|  | Charpy impact value/kJ/m$^2$ | 65.9 |
| Thermal properties | Glass transition temperature/° C. | 105.7 |

TABLE 4

|  |  | Example 1 | Example 1' |
|---|---|---|---|
| Radically polymerizable | Production Example 1 | 20 | — |
| polyether (A)/ | Production Example 1' | — | 20 |
| % by mass | Production Example 2 | — | — |
| (Meth)acrylic acid | Methyl methacrylate | 80 | 80 |
| ester monomer (B)/ |  |  |  |
| % by mass |  |  |  |
| Initiator | Irgacure 184/% by mass | 0.3 | 0.3 |
| Mold releasing agent | AEROSOL AOT-100/% by mass | 0.05 | 0.05 |
| 1st polymerization | Illuminance/mW/cm$^2$ | 2.1 | 2.1 |
| condition | Polymerization time/hour | 2 | 2 |
| 2nd polymerization | Polymerization temperature/° C. | 130 | 130 |
| condition | Polymerization time/hour | 0.5 | 0.5 |
| Optical properties | Total luminous transmittance/% | 92.5 | 92.6 |
|  | Haze/% | 0.5 | 0.2 |
| Optical properties after | Total luminous transmittance/% | 84.2 | 91.8 |
| weather resistance test | Haze/% | 25.1 | 3.5 |

Reagents Used

Tetrahydrofuran (manufactured by Wako Pure Chemical Industries, Ltd.)
Ytterbium(III) trifluoromethanesulfonate hydrate (manufactured by Tokyo Chemical Industry Co., Ltd.)
Glycidyl methacrylate (manufactured by Wako Pure Chemical Industries, Ltd.)
Ethanol (manufactured by Wako Pure Chemical Industries, Ltd.)
Methyl methacrylate (trade name: ACRYESTER M manufactured by Mitsubishi Rayon Co., Ltd.)
1-Hydroxy-cyclohexyl-phenyl-ketone (trade name: Irgacure 184 manufactured by BASF Japan Ltd.)
Dioctyl sodium sulfosuccinate (trade name: AEROSOL OT-100 manufactured by Nihon Cytec Industries Inc.)
Ethyl acetate (manufactured by Wako Pure Chemical Industries, Ltd.) and
t-Hexyl peroxypivalate (trade name: Perhexyl PV manufactured by NOF CORPORATION)

Production Method Examples

Hereinafter, the invention will be specifically described with reference to Examples.
The evaluation of the polyether-based copolymer was carried out by the following methods.
(1) $^1$H-NMR Spectrum
The structure of the compound was confirmed by $^1$H-NMR spectrum.
CDCl$_3$ was used as the solvent for measurement and tetramethylsilane was used as the standard substance, and the measurement was conducted using a nuclear magnetic resonance apparatus (JNM EX-270 manufactured by JEOL Ltd.). The measurement temperature was room temperature, and the integration number for the measurement was 16 times.

(2) Measurement of Molecular Weight

The number average molecular weight (Mn), mass average molecular weight (Mw), and molecular weight distribution (Mw/Mn) of the polymer were measured by GPC (HLC-8220 manufactured by Tosoh Corporation, column: TSK-GEL SUPER H-4000 and TSK-GEL SUPER H-2000 connected in series) using polystyrene as the standard substance.
The measurement was conducted under the conditions of eluent: chloroform, measurement temperature: 40° C., and flow rate: 0.6 mL/min.

(3) Yield
The yield was calculated from the sum of the masses of tetrahydrofuran and glycidyl methacrylate introduced at the time of polymerization and the mass of the solid recovered after evaporation.
(4) Evaluation on Polymerizability
The polymerizability was judged according to the following criteria based on the results of (2) and (3).
(A): number average molecular weight of 15,000 or more and yield of 40% or more
(B): number average molecular weight of 15,000 or more or yield of 40% or more
(C): number average molecular weight of less than 15,000 or/and yield of less than 40%

Production Method Example 1

To a 1000 ml three-necked flask equipped with a stirrer, a thermometer, and a cooling tube, 100 g of tetrahydrofuran (manufactured by Wako Pure Chemical Industries, Ltd.) and 0.67 g of ytterbium(III) trifluoromethanesulfonate hydrate (manufactured by Tokyo Chemical Industry Co., Ltd.) were added and stirred at room temperature. After it was confirmed that ytterbium(III) trifluoromethanesulfonate hydrate was dissolved, 4 g of glycidyl methacrylate (manufactured by Wako Pure Chemical Industries, Ltd.) was added thereto. After the addition, the mixture was stirred for 7 hours at room temperature (25° C.). After stirring, 8.3 g of ethanol (manufactured by Wako Pure Chemical Industries, Ltd.) was added thereto to stop the reaction. After the reaction was terminated, unreacted tetrahydrofuran or excess ethanol was distilled off using an evaporator, thereby obtaining 52 g of a white solid (yield: 50%).
The mass average molecular weight of the white solid thus obtained by GPC measurement was 33,800. In addition, the result of $^1$H-NMR measurement is presented below. The peaks of protons derived from the ring opening derivative of glycidyl methacrylate were observed at 5.55, 6.15, 4.15, 4.05, and 1.9, and the peaks of protons derived from the ring opening derivative of tetrahydrofuran were observed at from 3.1 to 3.9 and 1.6. It was confirmed that the white solid obtained from the above was a copolymer of poly(3-methacryloxypropene oxide) composed of a (meth)acryloyl backbone and polybutylene oxide. In addition, it was confirmed that the introduction rate, (m1/(m1+m2+n)), of poly(3-methacryloxypropene oxide) was 0.035 from the degree of polymerization, m, of poly(3-methacryloxypropene oxide) and the degree of polymerization, n, of polybutylene oxide in the radically polymerizable polyether.

$^1$H-NMR 0.95 (s') 1.60 (m), 1.9 (s), 2.35 (s') 3.1 to 3.9 (m), 4.05 (s), 4.25 (m), 5.55 (s), and 6.13 (s)

Production Method Example 2

Production Method Example 2 was conducted in the same manner as in Production Method Example 1 except that the amounts of tetrahydrofuran, glycidyl methacrylate, ytterbium(III) trifluoromethanesulfonate hydrate, and ethanol used and the reaction time were changed to the amounts used and the reaction time presented in Table 5. The yield was 57% and the mass average molecular weight of the copolymer thus obtained by GPC measurement was 40900.

Production Method Example 3

Production Method Example 3 was conducted in the same manner as in Production Method Example 1 except that glycidyl methacrylate was changed to R-glycidyl butyrate (manufactured by Tokyo Chemical Industry Co., Ltd.) and the amounts of tetrahydrofuran, ytterbium(III) trifluoromethanesulfonate hydrate, and ethanol used and the reaction time were changed to the amounts used and the reaction time presented in Table 5. The yield was 55% and the mass average molecular weight of the copolymer thus obtained by GPC measurement was 30400.

Production Method Example 4

Production Method Example 4 was conducted in the same manner as in Production Method Example 1 except that the amounts of tetrahydrofuran, glycidyl methacrylate, ytterbium(III) trifluoromethanesulfonate hydrate, and ethanol used and the reaction time were changed to the amounts used and the reaction time presented in Table 5. The yield was 39% and the mass average molecular weight of the copolymer thus obtained by GPC measurement was 23400.

Production Method Comparative Example 1

Production Method Comparative Example 1 was conducted in the same manner as in Production Method Example 1 except that glycidyl methacrylate was changed to 4-hydroxybutyl acrylate glycidyl ether (manufactured by Nippon Kasei Chemical Co., Ltd.) and the amounts of tetrahydrofuran, ytterbium(III) trifluoromethanesulfonate hydrate, and ethanol used and the reaction time were changed to the amounts used and the reaction time presented in Table 5. The yield was 27% and the mass average molecular weight of the copolymer thus obtained by GPC measurement was 16700. The carbonyl group was not adjacent to the glycidyl group as the glycidyl ester was changed to a glycidyl ether, thus the polymerization activity was not improved, and the molecular weight and the yield were lower as compared with those in Production Method Example 1 as a result.

TABLE 5

| | | Production Method Example 1 | Production Method Example 2 | Production Method Example 3 | Production Method Example 4 | Production Method Comparative Example 1 |
|---|---|---|---|---|---|---|
| Monomer 1 | Kind of monomer | Tetrahydrofuran | Tetrahydrofuran | Tetrahydrofuran | Tetrahydrofuran | Tetrahydrofuran |
| | Part by mass | 100 | 100 | 100 | 100 | 100 |
| Monomer 2 | Glycidyl ester (a) | Glycidyl methacrylate | Glycidyl methacrylate | Glycidyl butyrate | Glycidyl methacrylate | |
| | Part by mass | 4 | 4.5 | 4 | 2 | 0 |
| | Glycidyl ether | | | | | 4-hydroxybutyl acrylate glycidyl ether |
| | Part by mass | 0 | 0 | 0 | 0 | 4 |
| Catalyst | Kind of catalyst | Ytterbium trifluoromethanesulfonate hydrate | Ytterbium trifluoromethanesulfonate hydrate | Ytterbium trifluoromethanesulfonate hydrate | Ytterbium trifluoromethanesulfonate hydrate | Ytterbium trifluoromethanesulfonate hydrate |
| | Part by mass | 0.67 | 1 | 0.67 | 0.67 | 0.67 |
| Monomer 2/Catalyst | | 6 | 4.5 | 6 | 3 | 6 |
| Polymerization condition | Polymerization temperature/° C. | 25 | 25 | 25 | 25 | 25 |
| | Polymerization time/hour | 7 | 7 | 7 | 7 | 7 |
| Polymerization result | Yield/% | 50 | 57 | 55 | 39 | 27 |
| | Number average molecular weight (Mn) | 21600 | 25700 | 16400 | 16300 | 11000 |
| | Mass average molecular weight (Mw) | 33800 | 40900 | 30400 | 23400 | 16700 |
| | Mw/Mn | 1.6 | 1.6 | 1.9 | 1.4 | 1.5 |
| | Polymerizability | A | A | A | B | C |

A • • • number average molecular weight of 15,000 or more and yield of 40% or more B • • • number average molecular weight of 15,000 or more or yield of 40% or more C • • • number average molecular weight of less than 15,000 and yield of less than 40%

INDUSTRIAL APPLICABILITY

A (co)polymer produced from a radically polymerizable polyether and a radically polymerizable vinyl monomer exhibits excellent properties as described above, and thus it can be suitably used as a dense optical member of a flexible display front plate, a solar cell substrate, an organic EL substrate, a lighting cover, a liquid crystal display front plate, a light guide sheet, and the like.

The invention claimed is:

1. A radically polymerizable polyether (A) which has a mass average molecular weight of from 20,000 to 1,000,000 and a number average molecular weight of 20,000 to 100,000, comprising a polyalkylene ether backbone having a (meth)acryloyl group as a pendant group and a polytetramethylene ether backbone.

2. The radically polymerizable polyether (A) according to claim 1, which has a mass average molecular weight of from 20,000 to 1,000,000 and is represented by the following Formula (1):

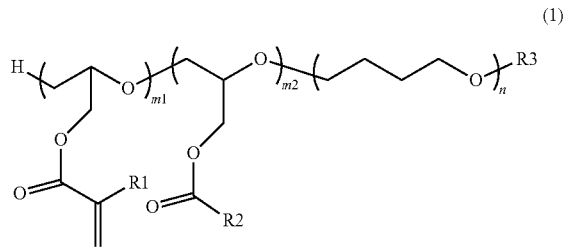

wherein:
m1 is from 1 to 7000,
m2 is from 0 to 7000,
n is from 1 to 14,000,
R1 is a methyl group or hydrogen, and
R2 and R3 are hydrogen or a hydrocarbon group having from 1 to 20 carbon atoms.

3. The radically polymerizable polyether (A) according to claim 2, wherein m1, m2, and n in Formula (1) are in a relation of $0.0005 \leq m1/(m1+m2+n) \leq 0.20$.

4. The radically polymerizable polyether (A) according to claim 2, wherein m1, m2, and n in Formula (1) are in a relation of $0.001 \leq m1/(m1+m2+n) \leq 0.10$.

5. A polymerizable composition (C) which comprises the radically polymerizable polyether (A) according to claim 1 and a radically polymerizable vinyl monomer (B), and wherein a composition ratio range of the component (A) to the component (B) is from 1 to 99% by mass of the component (A) and from 99 to 1% by mass of the component (B).

6. The polymerizable composition (C) according to claim 5, wherein the radically polymerizable vinyl monomer (B) is a (meth)acrylic monomer.

7. A copolymer formed by radical polymerization of the polymerizable composition (C) according to claim 5.

8. A molded article formed by radical polymerization of the polymerizable composition (C) according to claim 5 after being shaped into a desired shape.

9. A film formed by radical polymerization of the polymerizable composition (C) according to claim 5.

10. The film according to claim 9, which has a thickness of from 0.1 to 3000 μm.

11. The film according to claim 9, which has an elongation at break of 10% or more when a tension speed is 500 mm/min.

12. The film according to claim 9, which has a haze of 5% or less when a thickness thereof is 0.5 mm.

13. A method for producing a radically polymerizable polyether (A), wherein ring-opening polymerization of tetrahydrofuran is conducted by allowing from 1 to 20 parts by mass of a glycidyl ester (a) represented by the following Formula (2) to react with 100 parts by mass of tetrahydrofuran in the presence of a metal salt hydrate of trifluoromethanesulfonic acid (b) at from 0.1 to 5 parts by mass:

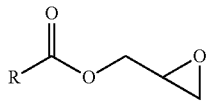

wherein:
R is a straight-chain or branched chain hydrocarbon group having from 1 to 20 carbon atoms and substituted by a hydrocarbon group containing an unsaturated bond and having from 2 to 10 carbon atoms.

14. The method according to claim 13, wherein a mass ratio (a)/(b) of the glycidyl ester (a) to the metal salt hydrate of trifluoromethanesulfonic acid (b) is from 2 to 9.

15. The method according to claim 13, wherein the glycidyl ester (a) is glycidyl methacrylate.

16. The method according to claim 13, wherein the metal of the metal salt hydrate of trifluoromethanesulfonic acid (b) is one or more selected from the group consisting of scandium, yttrium, and lanthanoid.

17. The method according to claim 13, wherein the metal salt hydrate of trifluoromethanesulfonic acid (b) is ytterbium trifluoromethanesulfonate hydrate.

* * * * *